United States Patent
Chang et al.

(10) Patent No.: US 8,546,705 B2
(45) Date of Patent: Oct. 1, 2013

(54) DEVICE AND METHOD FOR PREVENTING THE INFLUENCE OF CONDUCTING MATERIAL FROM POINT DETECTION OF PROJECTED CAPACITIVE TOUCH PANEL

(75) Inventors: Chin-Fu Chang, Taipei (TW); Yu-Han Lin, Taipei (TW); Cheng-Han Lee, Taipei (TW)

(73) Assignee: Egalax_Empia Technology Inc., Taipei (TW)

( * ) Notice: Subject to any disclaimer, the term of this patent is extended or adjusted under 35 U.S.C. 154(b) by 586 days.

(21) Appl. No.: 12/407,100

(22) Filed: Mar. 19, 2009

(65) Prior Publication Data

US 2009/0255737 A1 Oct. 15, 2009

(30) Foreign Application Priority Data

Mar. 19, 2008 (TW) .............................. 097109691 A
Jan. 9, 2009 (TW) .............................. 098100567 A (51) Int. Cl.
*G06F 3/044* (2006.01)
*G06F 3/041* (2006.01)
*G06F 3/045* (2006.01)
*G08C 21/00* (2006.01)

(52) U.S. Cl.
USPC .......................... 178/18.06; 345/173; 345/174

(58) Field of Classification Search
USPC .............. 345/173–174; 178/18.06; 204/416; 250/208.2; 348/308; 341/26
See application file for complete search history.

(56) References Cited

U.S. PATENT DOCUMENTS

| | | | | |
|---|---|---|---|---|
| 2007/0240914 A1* | 10/2007 | Lai et al. | ..................... | 178/18.06 |
| 2008/0048997 A1* | 2/2008 | Gillespie et al. | .............. | 345/174 |
| 2008/0277171 A1* | 11/2008 | Wright | ........................ | 178/18.06 |
| 2008/0309633 A1* | 12/2008 | Hotelling et al. | ............. | 345/173 |
| 2009/0002336 A1* | 1/2009 | Choi et al. | ..................... | 345/174 |
| 2009/0109190 A1* | 4/2009 | Elias | ............................. | 345/174 |
| 2009/0159344 A1* | 6/2009 | Hotelling et al. | .......... | 178/18.06 |

* cited by examiner

*Primary Examiner* — Quan-Zhen Wang
*Assistant Examiner* — Lin Li
(74) *Attorney, Agent, or Firm* — WPAT, PC; Justin King (57) ABSTRACT

This invention provides a device for preventing the influence of conducting material from point detection of projected capacitive touch panel. The device includes a first sensing layer having a plurality of first axial conductive lines isolated from each other and electrically connected to a plurality of first outside-connection conducting wires correspondingly, a second sensing layer having a plurality of second axial conductive lines isolated from each other and electrically connected to a plurality of second outside-connection conducting wires correspondingly, a signal driving line electrically connecting to the first and the second outside-connection conducting wires to provide a first sensing signal, and a sensing unit electrically connecting the first and the second outside-connection conducting wires to sense the sensing signal on the first and the second axial conductive lines. Wherein, the second sensing layer is on a dielectric layer, the first sensing layer, and a substrate in sequence.

24 Claims, 8 Drawing Sheets

FIG. 2C providing a first sensing signal to a plurality of first axial conductive lines and a plurality of second axial conductive lines
302 sensing a plurality of second and third sensing signals of the first and the second axial conductive lines simultaneously
304 utilizing at least one bigger change of the second and the third sensing signals respectively to match a corresponding coordinate to get the position of at least one touch point on the corresponding coordinate
306

FIG. 3A providing a first sensing signal to a plurality of first axial conductive lines and a plurality of second axial conductive lines
312 sensing a plurality of second sensing signals of the first axial conductive lines
314 sensing a plurality of third sensing signals of the second axial conductive lines
316 utilizing at least one bigger change of the second and the third sensing signals respectively to match a corresponding coordinate to get the position of at least one touch point on the corresponding coordinate
318

FIG. 3B providing a first sensing signal to a plurality of first axial conductive lines
322 sensing a plurality of second sensing signals of the first axial conductive lines and a plurality of third sensing signals of a plurality of second axial conductive lines simultaneously
324 utilizing at least one bigger change of the second and the third sensing signals respectively to match a corresponding coordinate to get the position of at least one touch point on the corresponding coordinate
326

DEVICE AND METHOD FOR PREVENTING THE INFLUENCE OF CONDUCTING MATERIAL FROM POINT DETECTION OF PROJECTED CAPACITIVE TOUCH PANEL

BACKGROUND OF THE INVENTION

1. Field of the Invention

This invention generally relates to the field of touch panel, and more particularly, to a device and method for preventing the influence of conducting material from point detection of projected capacitive touch panel.

2. Description of the Prior Art

Nowadays, the common touch technologies used by electronic devices include resistive, surface capacitive, projected capacitive, surface acoustic wave, optics imaging, infrared, bending wave, active digitizer, and so forth. Since the packaging volumes of the first three technologies are smaller, their precision can be done relatively high. And they are suitable to those smaller mobile device or portable consumer electronic products.

In terms of resistive touch technology, the techniques from pressing a touch screen to the contact detection, data operations, and the contact position confirmed have the technical limitations from the physical conditions. That is, in order to increase the detection area or resolution, it is necessary to increase the number of lines. However, the increase in the number of lines means that the data is also related increase in processing and computing. This causes a heavy load to the processor. In addition, touch-pressure mechanism is confirmed by the mechanical action completely, a PET film, no matter how to improve its pressure-resistance, wear-resistance, anti-deformation and so on, after all, the PET film has its limits. So the performance of the transparency is getting worse with the use of time and frequency. As for contact detection, some specific areas will be worn by excessively use, and thus, the conduction efficiency of an ITO conductive film is reduced. Besides, the ITO conductive film must reserve borders, and thus the optional of the industrial design is restricted. Still, the resistive touch technology is unable to achieve approach sense (fingers approach but not touch), as well as more difficult to deal with multi-touch.

Surface capacitive touch technology does not have to use the ITO conductive film with high-precision, so the touch side has no the similar mechanical structure like the resistive touch technology has. Thus, a surface capacitive touch screen will not be worn nor has a similar touch-mechanical fatigue which results in the sensitivity drop, and can also perform approach sense. However, the surface capacitive touch technology has the problem of hand-shadow effect. That is, when a surface capacitive touch screen is active, if user's wrist and fingers approach the screen surface together, it will make the surface of the ITO conductive film and the inside of the screen generate excessive charges. These excessive charges lead to produce coupling capacitance and make the surface capacitive touch screen sense error. Also, because the surface capacitive technology senses the contact by the change of the electric field, the accuracy of contact detection will be affected when the use of environment has the problem of electromagnetic interference. Still, after a prolonged use, the contact detection also easily offset, so regular or frequent calibration is required.

Figure 1A:
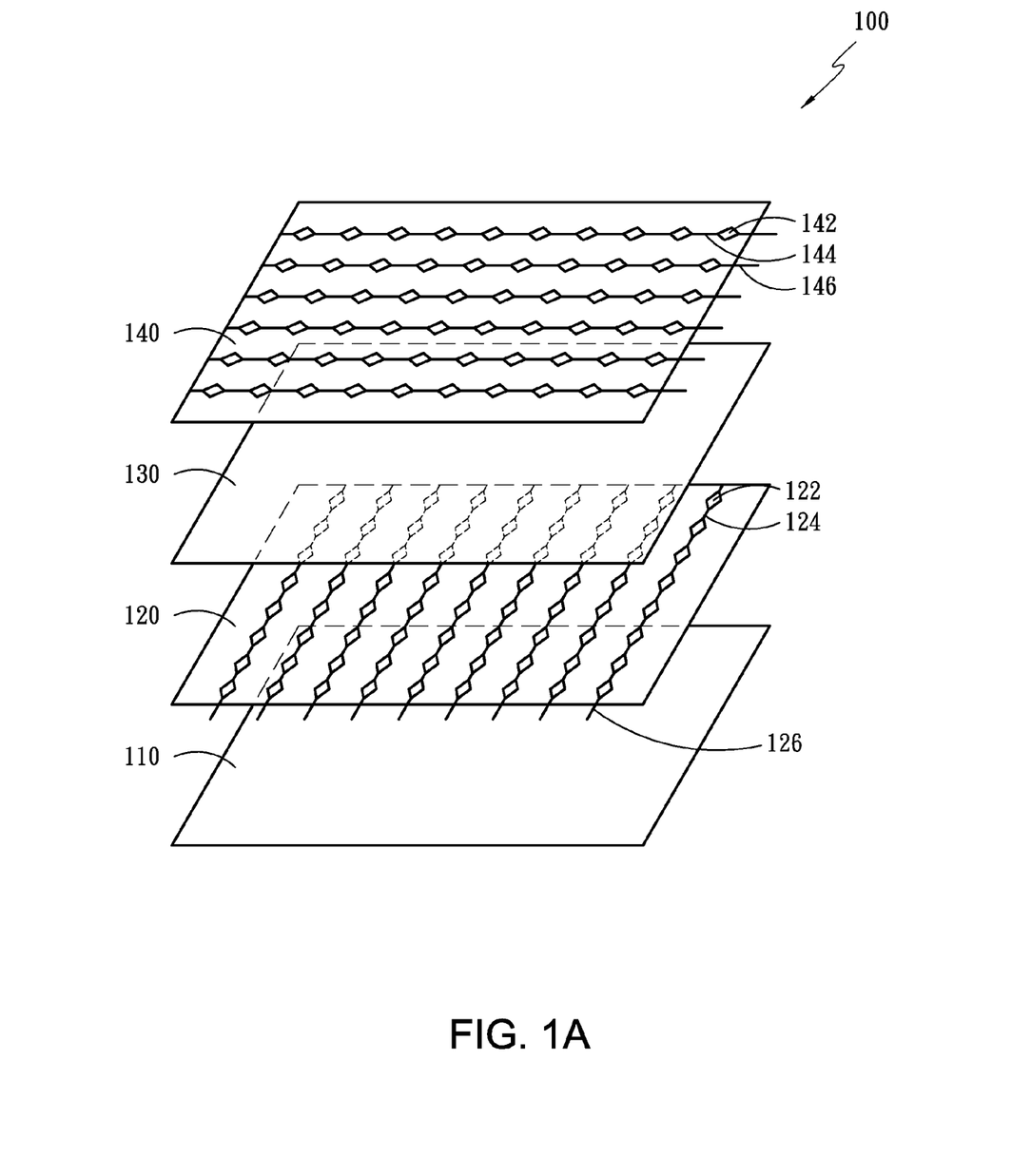
FIG. 1A illustrates a three-dimensional decomposition diagram of a well-known projected capacitive touch panel.

Referring to FIG. 1A, a three-dimensional decomposition diagram of a well-known projected capacitive touch panel 100 is depicted. The projected capacitive touch panel 100 at least includes a substrate 110, a first sensing layer 120, a dielectric layer 130, a second sensing layer 140, a bonding layer (not shown), and a protecting layer (not shown) from bottom-up to stack up with the same shape. Herein, these elements mentioned above are transparent. The first sensing layer 120 has a plurality of first patterned electrodes 122 serially connected by a plurality of first axial conductive lines 124 correspondingly, and then electrically connected to a plurality of first outside-connection conducting wires 126 correspondingly. The second sensing layer 140 has a plurality of second patterned electrodes 142 serially connected by a plurality of second axial conductive lines 144 correspondingly, and then electrically connected to a plurality of second outside-connection conducting wires 146 correspondingly. In the present diagram, the axial direction of the first axial conductive lines 124 is Y-axial and the axial direction of the second axial conductive lines 144 is X-axial, but not limited to, the first axial direction could also be X-axial and the second axial direction could be Y-axial as well.

Figure 1B:
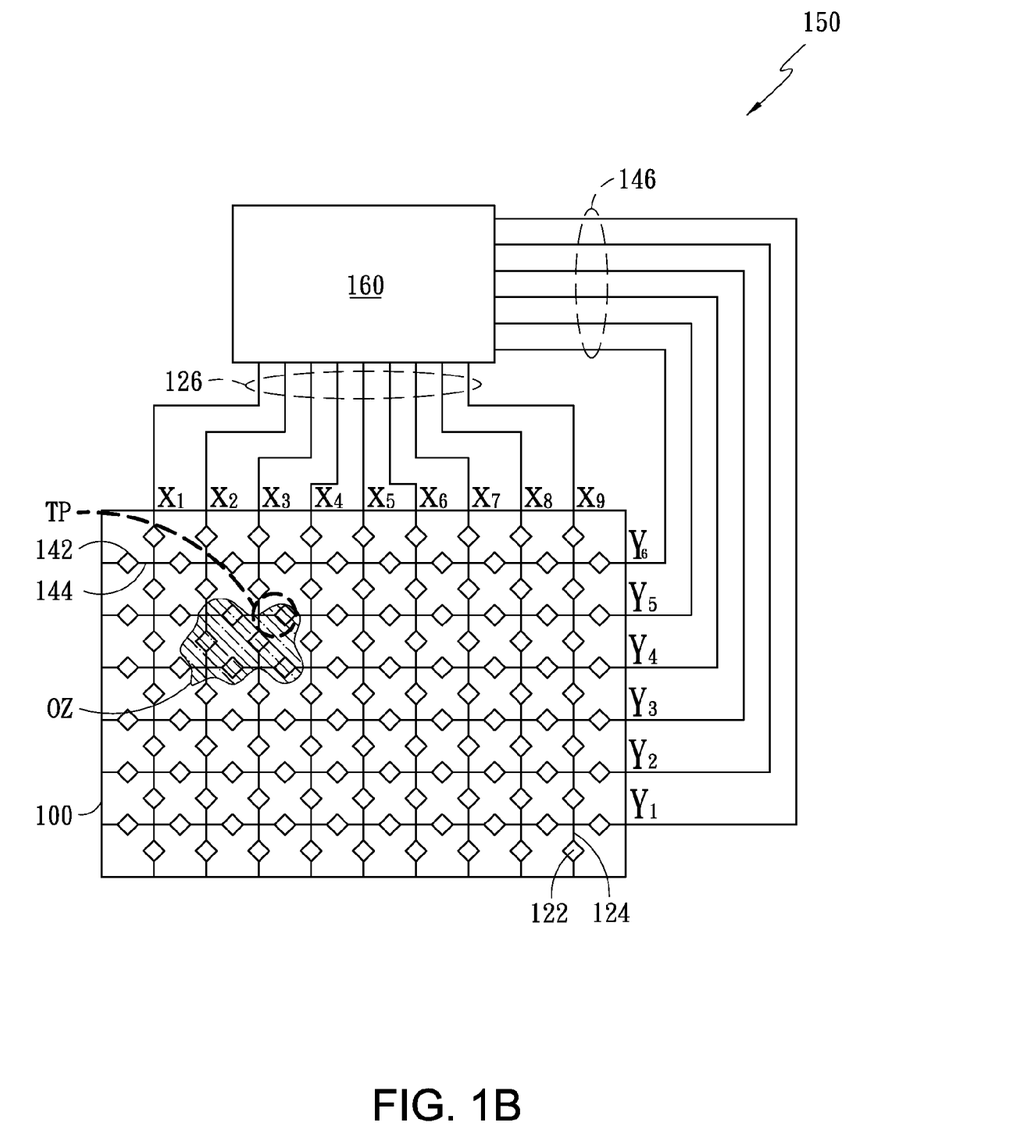
FIG. 1B illustrates an active circuit of the projected capacitive touch panel shown in FIG. 1A.

Referring to FIG. 1B, the active circuit 150 of the projected capacitive touch panel 100 shown in FIG. 1A is depicted. A plurality of first and second outside-connection conducting wires 126, 146 electrically connect to a sensing unit 160. The relations among the first and the second patterned electrodes 122, 142, the first and the second axial conductive lines 124, 144, and the first and the second outside-connection conducting wires 126, 146 are described in FIG. 1A, and shall not be repeated here. When the circuit is active, the sensing unit 160 sequentially provides a sensing signal to every first axial conductive line 124 by each corresponding first outside-connection conducting wire 126, and then sequentially provides the sensing signal to every second axial conductive line 144 by each corresponding second outside-connection conducting wire 146. In the meanwhile, the first and the second axial conductive lines 122, 144 which do not receive the sensing signal are electrically connected to ground or a fixed voltage level. Since the stray capacitance exists between the first and the second axial conductive lines 124, 144, when a user uses his/her finger or conducting material to approach or touch a touch point TP on the projected capacitive touch panel 100, the finger or the conducting material on the touch point TP forms an extra capacitance with the first and the second axial conductive lines 124, 144. This causes the value of the equivalent capacitance to be changed. The sensing unit 160 senses the relatively bigger change of corresponding current or charges to decide the position of the touch point, such as (X3, Y5). In short, the measuring control circuit sequentially drives a sensing signal to each first and second axial conductive line, and senses the relatively bigger change of corresponding current or charges generated by driving the sensing signal to decide the position of the point. Wherein, when any axial conductive line is driven by the sensing signal and is sensed to get its current change or charge change, other axial conductive lines are electrically connected to ground or a fixed voltage level to make the effect of stray capacitance consistent.

However, when the projected capacitive touch panel 100 has a conducting material area OZ on, such as water or other conducting material, the equivalent circuit and the equivalent stray capacitance between the axial conductive lines on the conducting material area OZ will be changed. This change makes the measuring control circuit, such as sensing unit 160, sense the current change or charge change on the axial conductive lines, and then results in misjudgment and mal-operation. Or, when the axial conductive line related to the touch point TP is provided the sensing signal and is sensed change in current or charges, the current change or the charge change are affected by the conducting material area OZ. That is, those relatively bigger changes of the current or charges are bypassed to the adjacent axial conductive line to ground through the conducting material area OZ. Therefore, the position of the touch point TP cannot be correctly sensed.

In view of the drawbacks mentioned with the prior art of touch point detection, there is a continuous need to develop a new and improved device and method for touch point detection that overcomes the shortages associated with the prior art. The advantages of the present invention are that it solves the problems mentioned above.

SUMMARY OF THE INVENTION

In accordance with the present invention, a device and method for preventing the influence of conducting material from point detection of projected capacitive touch panel substantially obviates one or more of the problems resulted from the limitations and disadvantages of the prior art mentioned in the background.

One of the purposes of the present invention is to provide a sensing signal to the axial conductive lines of a touch panel, whereby the current and charges among the axial conductive lines can be eliminated.

The present invention provides a device for preventing the influence of conducting material from point detection of projected capacitive touch panel. The device includes a first sensing layer having a plurality of first axial conductive lines isolated from each other and electrically connected to a plurality of first outside-connection conducting wires correspondingly, a second sensing layer having a plurality of second axial conductive lines isolated from each other and electrically connected to a plurality of second outside-connection conducting wires correspondingly, a signal driving line electrically connecting to the first and the second outside-connection conducting wires to provide a first sensing signal, and a sensing unit electrically connecting the first and the second outside-connection conducting wires to sense the sensing signal on the first and the second axial conductive lines. Wherein, the second sensing layer is on a dielectric layer, the first sensing layer, and a substrate in sequence.

The present invention provides a method for preventing the influence of conducting material from point detection of projected capacitive touch panel. The method includes (a) providing a first sensing signal to a plurality of first and second axial conductive lines, wherein the first and second axial conductive lines are electrically isolated from each other; (b) sensing a plurality of second and third sensing signals simultaneously, wherein the second and the third sensing signals are correspondingly generated by the first and the second axial conductive lines receiving the first sensing signal respectively; and (c) utilizing at least one bigger change of the second and the third sensing signals respectively to match a corresponding coordinate to get the position of at least one touch point on the corresponding coordinate.

The present invention provides a method for preventing the influence of conducting material from point detection of projected capacitive touch panel. The method includes (a) providing a first sensing signal to a plurality of first and second axial conductive lines, wherein the first and second axial conductive lines are electrically isolated from each other; (b) sensing a plurality of second sensing signals; (c) sensing a plurality of third sensing signals, wherein the second and the third sensing signals are correspondingly generated by the first and the second axial conductive lines receiving the first sensing signal respectively; and (d) utilizing at least one bigger change of the second and the third sensing signals respectively to match a corresponding coordinate to get the position of at least one touch point on the corresponding coordinate.

The present invention provides a method for preventing the influence of conducting material from point detection of projected capacitive touch panel. The method includes (a) providing a first sensing signal to a plurality of first axial conductive lines, wherein the first axial conductive lines are electrically isolated from each other; (b) sensing a plurality of second sensing signals of the first axial conductive lines and a plurality of third sensing signals of a plurality of second axial conductive lines, wherein the second axial conductive lines are electrically isolated from each other and are isolated from the first axial conductive lines, the second and the third sensing signals are correspondingly generated by the first and the second axial conductive lines receiving the first sensing signal and capacitively coupling the second sensing signals respectively; and (c) utilizing at least one bigger change of the second and the third sensing signals respectively to match a corresponding coordinate to get the position of at least one touch point on the corresponding coordinate.

The present invention provides a method for preventing the influence of conducting material from point detection of projected capacitive touch panel. The method includes (a) providing a first sensing signal to a plurality of first axial conductive lines, wherein the first axial conductive lines are electrically isolated from each other; (b) sensing a plurality of second sensing signals of the first axial conductive lines; (c) sensing a plurality of third sensing signals of a plurality of second axial conductive lines, wherein the second axial conductive lines are electrically isolated from each other and are isolated from the first axial conductive lines, the second and the third sensing signals are correspondingly generated by the first and the second axial conductive lines receiving the first sensing signal and capacitively coupling the second sensing signals respectively; and (d) utilizing at least one bigger change of the second and the third sensing signals respectively to match a corresponding coordinate to get the position of at least one touch point on the corresponding coordinate.

The present invention provides a method for preventing the influence of conducting material from point detection of projected capacitive touch panel. The method includes (a) providing a first sensing signal to a plurality of first axial conductive lines, wherein the first axial conductive lines are electrically isolated from each other; (b) sensing a plurality of second sensing signals of a plurality of second axial conductive lines, wherein the second axial conductive lines are electrically isolated from each other and are isolated from the first axial conductive lines; (c) sensing a plurality of third sensing signals of the first axial conductive lines, wherein the second sensing signals are correspondingly generated by the second axial conductive lines capacitively coupling the third sensing signals, the third sensing signals are correspondingly generated by the first axial conductive lines receiving the first sensing signal; and (d) utilizing at least one bigger change of the second and the third sensing signals respectively to match a corresponding coordinate to get the position of at least one touch point on the corresponding coordinate.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Some embodiments of the present invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figure 2A:
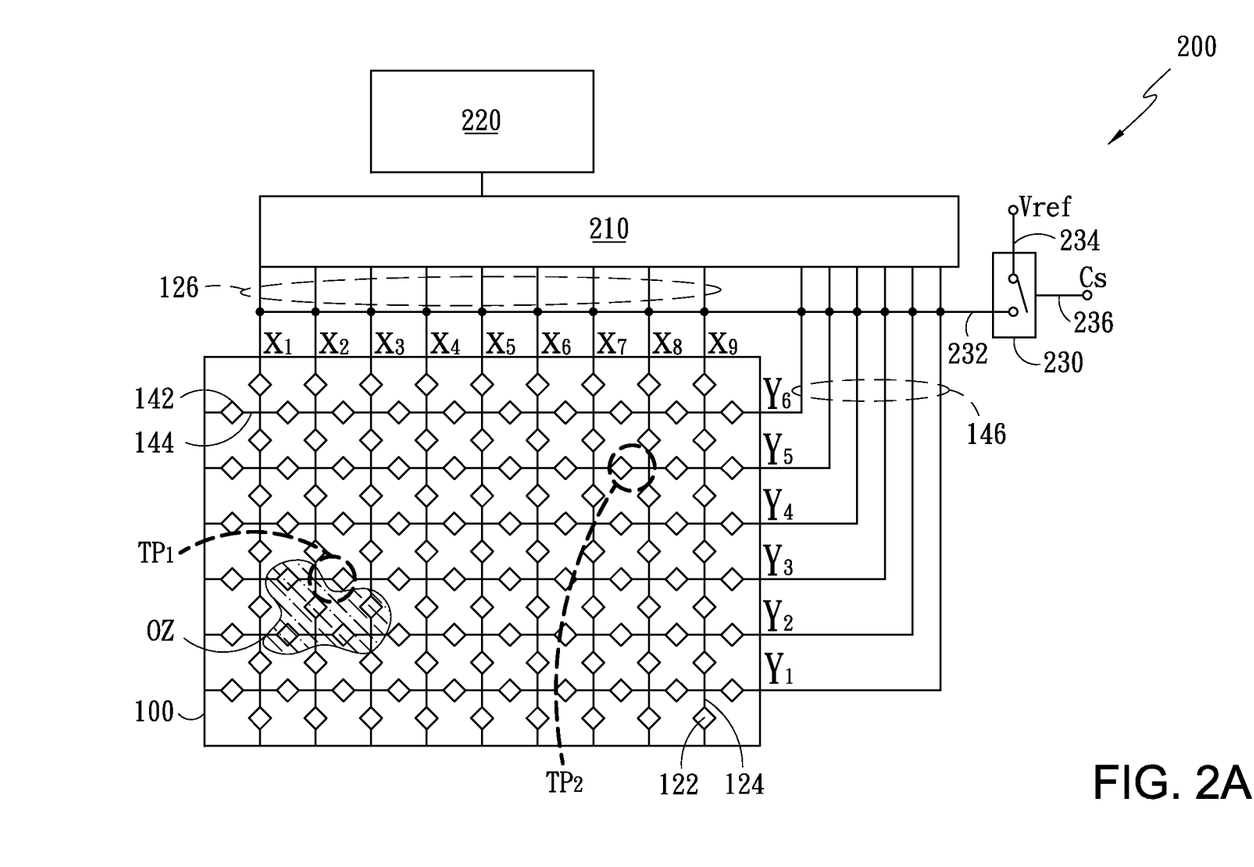
FIG. 2A illustrates an active circuit of one preferred embodiment in accordance with the present invention.

Referring to FIG. 2A, an active circuit 200 of one preferred embodiment in accordance with the present invention is depicted. A projected capacitive touch panel 100 (referring to FIG. 1A) at least includes a first sensing layer 120 and a second sensing layer 140. The first sensing layer 120 has a plurality of first axial conductive lines 124 isolated from each other and correspondingly electrically connected to a plurality of first outside-connection conducting wires 126. Herein, the first sensing layer 120 further has a plurality of first patterned transparent electrodes 122 serially connected to the first axial conductive lines 124 in cycle. The second sensing layer 140 has a plurality of second axial conductive lines 144 isolated from each other and correspondingly electrically connected to a plurality of second outside-connection conducting wires 146. Herein, the second sensing layer 120 further has a plurality of second patterned transparent electrodes 142 serially connected to the second axial conductive lines 144 in cycle. Wherein, the second sensing layer 140 is on a dielectric layer 130, the dielectric layer 130 is on the first sensing layer 120, the first sensing layer 120 is on a substrate 110, and a bonding layer (not shown) and a protecting layer (not shown) are on the second sensing layer 140. In this embodiment, the first sensing layer 120, the first patterned electrodes 122, the first axial conductive lines 124, the second sensing layer 140, the second patterned electrodes 142, the second axial conductive lines 144, the substrate 110, the dielectric layer 130, the bonding layer and the protecting layer are transparent material. Besides, the axial direction of the first axial conductive lines 124 is Y-axial and the axial direction of the second axial conductive lines 144 is X-axial. The axial directions of the first and the second axial conductive lines 124, 144, however, could be X-axial and Y-axial, respectively. Or, the axial directions of the two axial conductive lines 124, 144 are not perpendicular to each other.

Referring to FIG. 2A again, a signal driving line 232 electrically connects to the first and the second outside-connection conducting wires 126, 146 and a control switch 230 to receive and transmit a first sensing signal Vref. Herein, the first end of the control switch 230 electrically connects to the signal driving line 232, and its third end 236 receives a control signal CS to control the first sensing signal Vref received by its second end 234. Then the first sensing signal Vref is transmitted to the first and the second outside-connection conducting wires 126, 146. A sensing unit 220 electrically connects to the first and the second outside-connection conducting wires 126, 146 through a multiplexer 210 to sense the sensing signals on the correspondingly electrical connections of the first and the second axial conductive lines 124, 126. In this embodiment, the control switch 230 could be an electronic switch (such as BJT, CMOS or photo-coupler) or could be an electromechanical switch (such as electromagnetic reed switch). The sensing unit 220 could be a current detector or a charge detector. The number of the multiplexer 210 and the sensing unit 220 could be increased or decreased depend on the limit of total cost and the speed of touch position sensing. This part, however, can be figured out by those skilled in the art according to the present embodiment. Thus, no more detail will be described.

Referring to FIG. 2A again, when the control switch 230 receives the control signal CS to make itself close, the first and the second outside-connection conducting wires 126, 146 receive the first sensing signal Vref by the signal driving line 232. This makes the entire first and second axial conductive lines 124, 144 have the same voltage level, the first sensing signal Vref. In the meantime, there is no voltage difference among the first and the second axial conductive lines 124, 144, so there is no current loop among them as well. If a conducting material area OZ exists on the projected capacitive touch panel 100 in the meanwhile, the conducting material area OZ will not form current loops with the first and the second axial conductive lines 124, 144 because there is no voltage difference among the first and the second axial conductive lines 124, 144. Therefore, the conducting material area OZ does not change the current among the first and the second axial conductive lines 124, 144. In the present invention, the conducting material area OZ means those conducting material areas existing on the protecting layer of the touch panel (such as water, other conducting material etc.) before a user uses his/her finger or other conducting material to touch the touch panel.

When a user uses his/her finger or conducting material to approach or touch a touch point TP2 on the projected capacitive touch panel 100, the axial conductive lines 124, 144 and the outside-connection conducting wires 126, 146 related to the touch point TP2, such as X7, X8 and Y4, Y5, have current formed on them, because the touch point TP2 forms a loop to ground through the user body. When the sensing unit 220 senses each outside-connection conducting wire 126, 146, the current or the charge change on the outside-connection conducting wires 126, 146 (X7, X8, Y4, Y5) can be sensed. If the current change or the charge change on X8 is bigger than those on X7, and the current change or the charge change on Y5 is bigger than those on Y4, that means the touch point TP2 near the coordinate position (X8, Y5).

When a user uses his/her finger or conducting material to approach or touch a touch point TP1 on the projected capacitive touch panel 100, the axial conductive lines 124, 144 and the outside-connection conducting wires 126, 146 related to the touch point TP1 and the conducting material area OZ, such as X2, X3 and Y2, Y3, will not be affected by the conducting material area OZ. That is, the axial conductive lines 124, 144 and the outside-connection conducting wires 126, 146 have the same voltage level, so when the touch point TP1 causes bigger current or charge changes on X2, Y3 of the outside-connection conducting wires 126, 146, the bigger current and charge will not be bypassed to ground through X3, Y2 of the outside-connection conducting wires 126, 146.

Thus, the position of the touch point TP1 still can be sensed exactly. What is emphasized here is the coordinate system used above being only to explain the relation between the axial conductive lines 124, 144 of the present embodiment and their corresponding coordinate system. It is not to limit the coordinate system of the embodiments in accordance with the present invention. Besides, those skilled in the art could easily figure out that the position of each touch point can be calculated out through at least one axial conductive line near the touch point. For example: the interpolation uses the current or charge change of the axial conductive line near the touch point as weight, referring to the coordinate of the axial conductive line near the touch point, and calculates out the center of mass.

Moreover, the above-mentioned embodiments only use one conducting material area OZ and one touch point TP1 or TP2 as explanations. When there are many conducting material areas and touch points existing, the embodiments mentioned above are still available. This part can be figured out by those skilled in the art according to those embodiments, and thus, no more detail will be described.

Figure 3A:
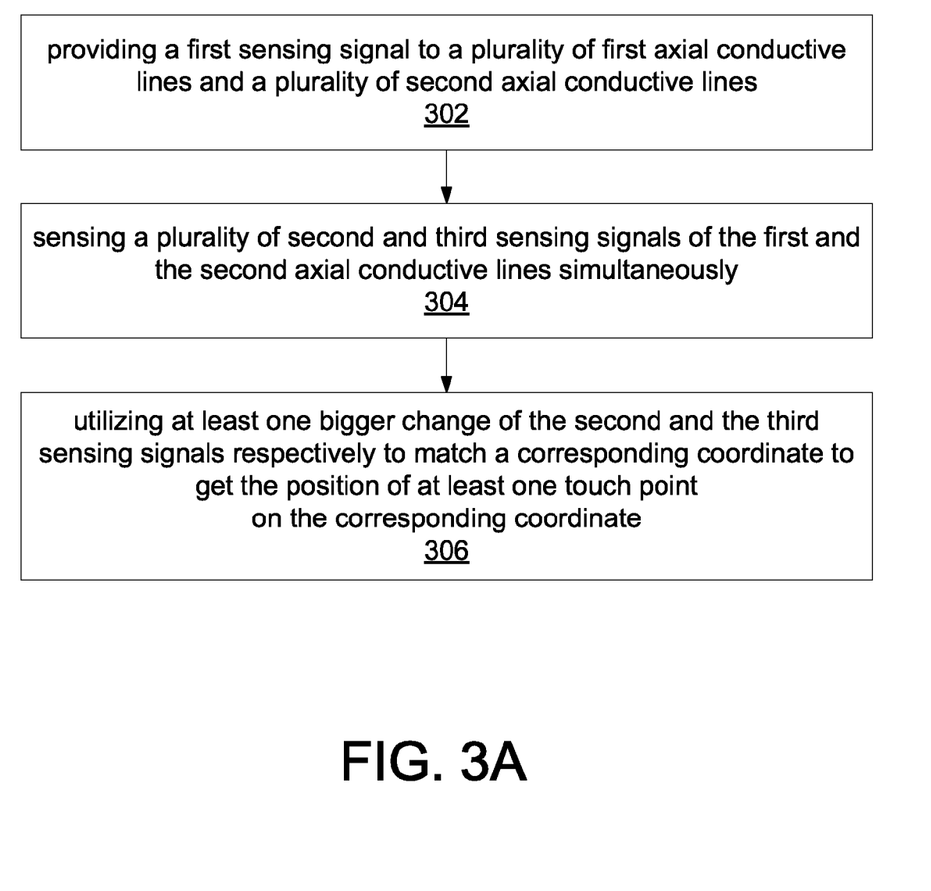
FIG. 3A illustrates a flow chart of a preferred embodiment in accordance with the present invention.

Referring to FIG. 3A, a flow chart of a preferred embodiment in accordance with the present invention is depicted. Please also refer to FIG. 2A at the same time. In step 302, providing a first sensing signal Vref to a plurality of first axial conductive lines 124 concurrently and a plurality of second axial conductive lines 144 concurrently. Herein, the plurality of first and second axial conductive lines 124, 144 are electrically isolated from each other. In step 304, the sensing unit 220 simultaneously senses a plurality of second and third sensing signals of the plurality of first and second axial conductive lines 124, 144. Herein, the plurality of second and third sensing signals are correspondingly generated by the plurality of first and second axial conductive lines 124, 144 receiving the first sensing signal Vref. In step 306, the sensing unit 220 respectively uses at least one bigger change of the plurality of second and third sensing signals to match a corresponding coordinate to get the position of at least one touch point on the corresponding coordinate. In the present embodiment, the first axial conductive lines 124 are X-axial, the second axial conductive lines 144 are Y-axial, and the corresponding coordinate is an X-Y perpendicular coordinate. Herein, the first and the second axial conductive lines 124, 144 include transparent material. A transparent dielectric layer is inserted between and used to isolate the first and the second axial conductive lines 124, 144. The first sensing signal Vref is provided by a voltage-sensing source or a current-sensing source, and the sensing unit 220 could include at least one current detector or at least one charge detector.

Figure 3B:
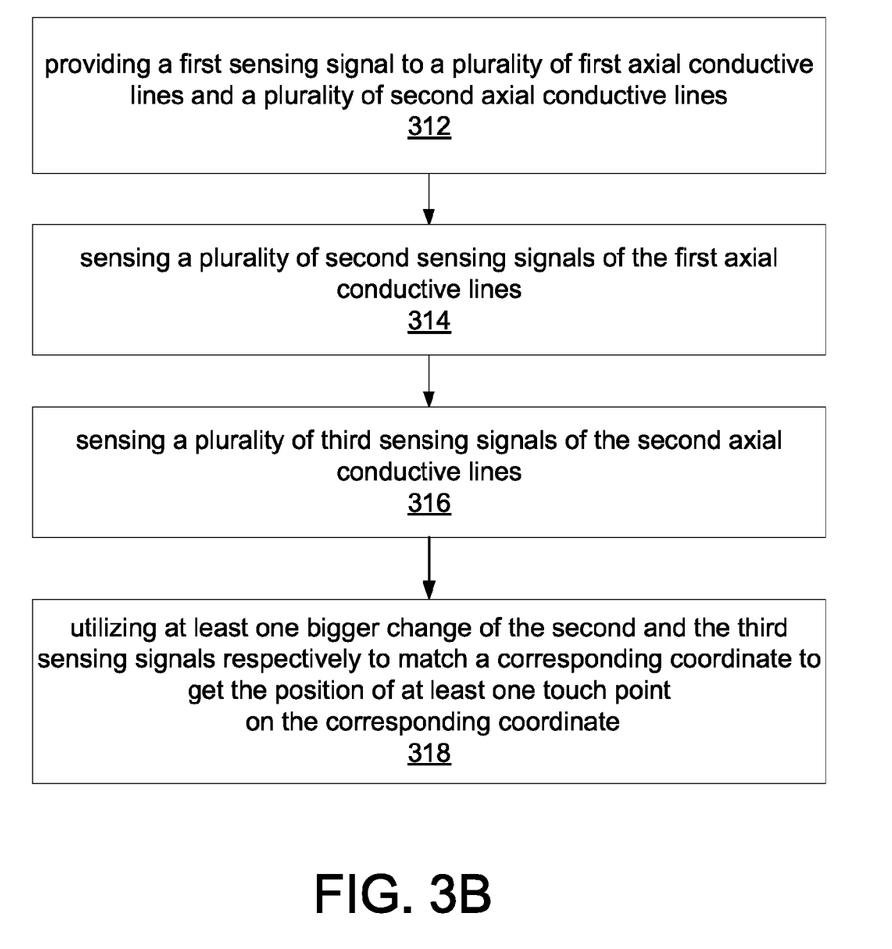
FIG. 3B illustrates a flow chart of another preferred embodiment in accordance with the present invention.

Referring to FIG. 3B, a flow chart of another preferred embodiment in accordance with the present invention is depicted. Please also refer to FIG. 2A at the same time. In step 312, providing a first sensing signal Vref to a plurality of first axial conductive lines 124 at once and a plurality of second axial conductive lines 144 at the same time. Herein, the plurality of first and second axial conductive lines 124, 144 are electrically isolated from each other. In step 314, the sensing unit 220 senses a plurality of second sensing signals of the plurality of first axial conductive lines 124. Herein, the plurality of second sensing signals are correspondingly generated by the plurality of first axial conductive lines 124 receiving the first sensing signal Vref. In step 316, the sensing unit 220 senses a plurality of third sensing signals of the plurality of second axial conductive lines 144. Herein, the plurality of third sensing signals are correspondingly generated by the plurality of second axial conductive lines 144 receiving the first sensing signal Vref. In step 318, the sensing unit 220 respectively uses at least one bigger change of the plurality of second and third sensing signals to match a corresponding coordinate to get the position of at least one touch point on the corresponding coordinate. In the present embodiment, the first axial conductive lines 124 are X-axial, the second axial conductive lines 144 are Y-axial, and the corresponding coordinate is an X-Y perpendicular coordinate. Or, the first axial conductive lines 124 are Y-axial; the second axial conductive lines 144 are X-axial. Herein, the first and the second axial conductive lines 124, 144 include transparent material. A transparent dielectric layer is inserted between and used to isolate the first and the second axial conductive lines 124, 144. The first sensing signal Vref is provided by a voltage-sensing source or a current-sensing source, and the sensing unit 220 could include at least one current detector or at least one charge detector.

The two above-mentioned embodiments, referring to FIGS. 3A and 3B, in sensing the second and the third sensing signals of the first and the second axial conductive lines 124, 144, whatever their sensing methods are simultaneous or consecutive, their sensing steps could be sensing the second sensing signals of the first axial conductive lines 124 in sequence and sensing the third sensing signals of the second axial conductive lines 144 in order. Herein, every first axial conductive line 124 is sensed in sequence and every second axial conductive line 144 is sensed in order. Or, several first axial conductive lines 124 are sensed in sequence and several second axial conductive lines 144 are sensed in order. In addition, their sensing steps could also be sensing the second sensing signals of the first axial conductive lines 124 by selected and sensing the third sensing signals of the second axial conductive lines 144 by selected. That is, their sensing steps do not process in order, such as interlaced scanning. Likewise, every first axial conductive line 124 could be sensed by selected and every second axial conductive line 144 could be sensed by selected. Or, several first axial conductive lines 124 are sensed by selected and several second axial conductive lines 144 are sensed by selected.

Figure 2B:
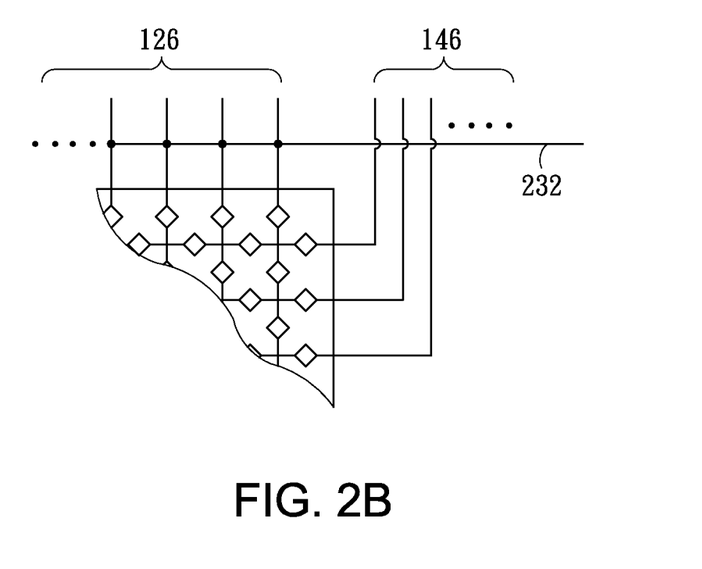
FIG. 2B illustrates a part of circuit for another preferred embodiment shown in FIG. 2A.
Figure 2C:
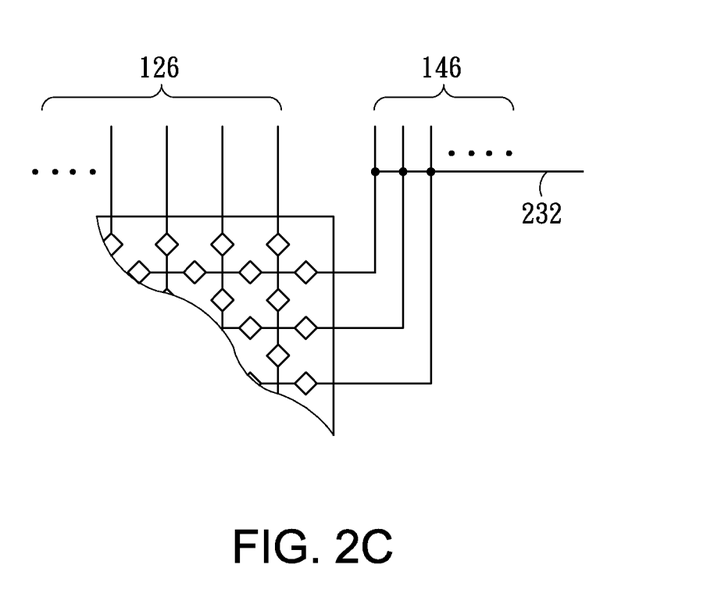
FIG. 2C illustrates a part of circuit for further another preferred embodiment shown in FIG. 2A.
Figure 3C:
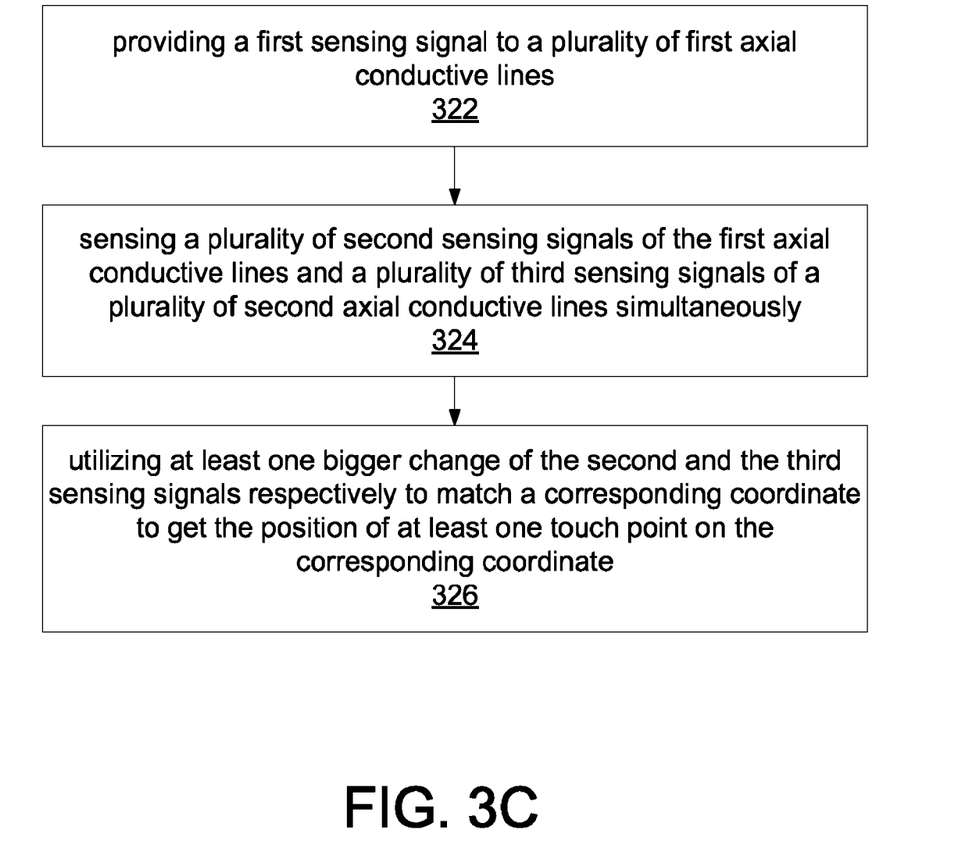
FIG. 3C illustrates a flow chart of further another preferred embodiment in accordance with the present invention.
Figure 3D:
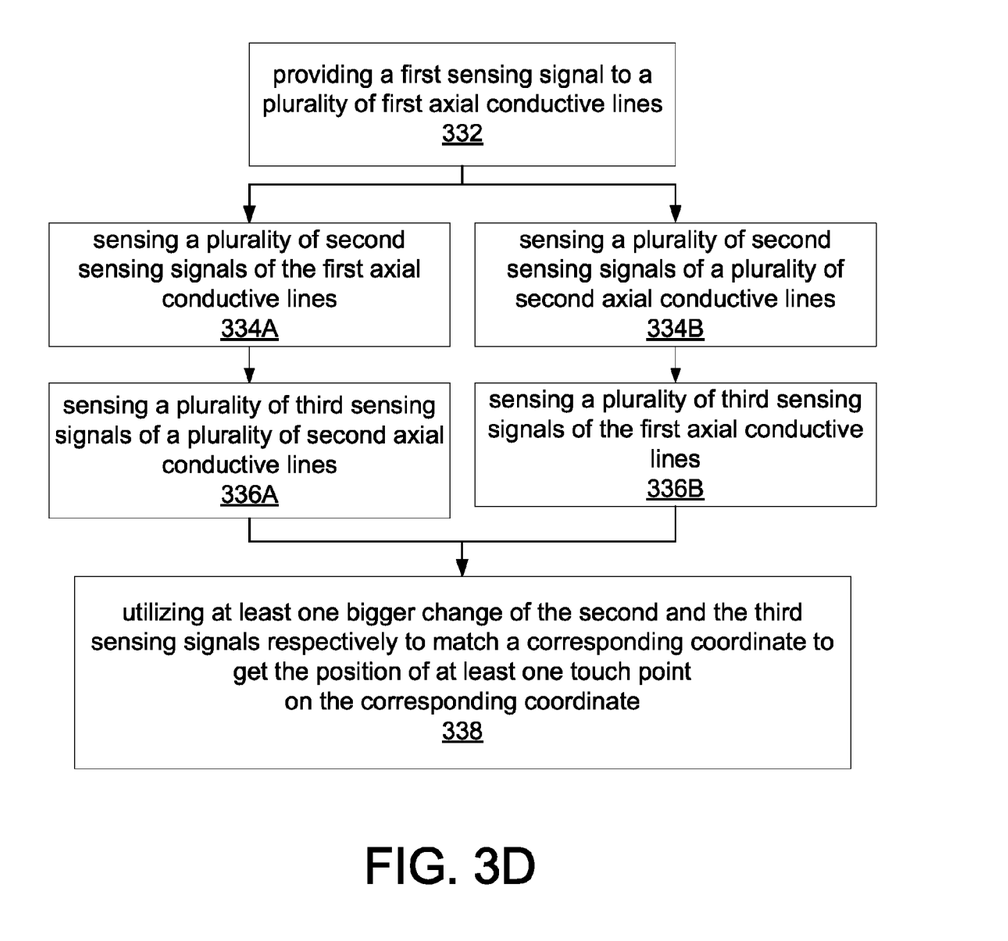
FIG. 3D illustrates two flow charts of still other preferred embodiments in accordance with the present invention.

The inventor emphasizes that the active circuit of the preferred embodiment shown in FIG. 2A must be fixed to match the flow charts of the preferred embodiments illustrated in FIGS. 3C and 3D. That is, the signal driving line 232 only electrically connects to a plurality of first outside-connection conducting wires 126, as shown in FIG. 2B, or only electrically connects to a plurality of second outside-connection conducting wires 146, as shown in FIG. 2C. By doing so, the first sensing signal Vref is driven on the first axial conductive lines 124 only or on the second axial conductive lines 144 only to match the flow charts depicted in FIGS. 3C and 3D.

Referring to FIG. 3C, a flow chart of further another preferred embodiment in accordance with the present invention is depicted. Please also refer to FIG. 2A all at once. In step 322, providing a first sensing signal Vref to a plurality of first axial conductive lines 124 concurrently. Herein, the plurality of first axial conductive lines 124 are electrically isolated from each other. In step 324, the sensing unit 220 senses a plurality of sensing signals (second sensing signals) of the plurality of first axial conductive lines 124 and a plurality of sensing signals (third sensing signals) of a plurality of second axial conductive lines 144 simultaneously. Herein, the plurality of second axial conductive lines 144 are electrically isolated from each other and are isolated from the first axial conductive lines 124. The plurality of second sensing signals are correspondingly generated by the plurality of first axial conductive lines 124 receiving the first sensing signal Vref, and the plurality of third sensing signals are correspondingly generated by the plurality of second axial conductive lines 144 capacitively coupling the second sensing signals. In step 326, the sensing unit 220 respectively uses at least one bigger change of the plurality of second and third sensing signals to match a corresponding coordinate to get the position of at least one touch point on the corresponding coordinate. In the present embodiment, the plurality of third sensing signals includes the stray capacitance between the first and the second axial conductive lines 124, 144.

Referring to FIG. 3D, two flow charts of still other preferred embodiments in accordance with the present invention is depicted. Please also refer to FIG. 2A all at once. In step 332, providing a first sensing signal Vref to a plurality of first axial conductive lines 124 all together. Herein, the plurality of first axial conductive lines 124 are electrically isolated from each other. In step 334A, the sensing unit 220 senses a plurality of sensing signals (second sensing signals) of the plurality of first axial conductive lines 124. Herein, the plurality of second sensing signals are correspondingly generated by the plurality of first axial conductive lines 124 receiving the first sensing signal Vref. In step 336A, the sensing unit 220 senses a plurality of sensing signals (third sensing signals) of a plurality of second axial conductive lines 144. Herein, the plurality of second axial conductive lines 144 are electrically isolated from each other and are isolated from the first axial conductive lines 124. The plurality of third sensing signals are correspondingly generated by the plurality of second axial conductive lines 144 capacitively coupling the second sensing signals. In step 338, the sensing unit 220 respectively uses at least one bigger change of the plurality of second and third sensing signals to match a corresponding coordinate to get the position of at least one touch point on the corresponding coordinate. In the present embodiment, the plurality of third sensing signals includes the stray capacitance between the first and the second axial conductive lines 124, 144.

Referring to FIG. 3D again, and also refer to FIG. 2A all at once. The step 334B continues the step 332. In step 334B, the sensing unit 220 senses a plurality of sensing signals (second sensing signals) of a plurality of second axial conductive lines 144. Herein, the plurality of second axial conductive lines 144 are electrically isolated from each other and are isolated from the first axial conductive lines 124. In step 336B, the sensing unit 220 senses a plurality of sensing signals (third sensing signals) of the plurality of first axial conductive lines 124. Herein, the plurality of third sensing signals are correspondingly generated by the plurality of first axial conductive lines 124 receiving the first sensing signal Vref. The plurality of second sensing signals are correspondingly generated by the plurality of second axial conductive lines 144 capacitively coupling the third sensing signals. The next step 338 is described above, so it is not necessary to be repeated here. In the present embodiment, the plurality of second sensing signals includes the stray capacitance between the first and the second axial conductive lines 124, 144.

In three above-mentioned preferred embodiments shown in FIGS. 3C and 3D, the axial direction of the first axial conductive lines 124 include X-axial, the axial direction of the second axial conductive lines 144 includes Y-axial, and the corresponding coordinate is an X-Y perpendicular coordinate. Or, the axial direction of the first axial conductive lines 124 includes Y-axial; the axial direction of the second axial conductive lines 144 includes X-axial. Herein, the first and the second axial conductive lines 124, 144 include transparent material. A transparent dielectric layer is inserted between and used to isolate the first and the second axial conductive lines 124, 144. The first sensing signal Vref is provided by a voltage-sensing source or a current-sensing source, and the sensing unit 220 could include at least one current detector or at least one charge detector.

Moreover, the three above-mentioned preferred embodiments, referring to FIGS. 3C and 3D, in sensing the sensing signals of the first and the second axial conductive lines 124, 144, whatever their sensing methods are simultaneous or consecutive, their sensing steps could be sensing the sensing signals of the first axial conductive lines 124 in sequence and sensing the sensing signals of the second axial conductive lines 144 in order. Herein, every first axial conductive line 124 is sensed in sequence and every second axial conductive line 144 is sensed in order. Or, several first axial conductive lines 124 are sensed in sequence and several second axial conductive lines 144 are sensed in order. In addition, their sensing steps could also be sensing the sensing signals of the first axial conductive lines 124 by selected and sensing the sensing signals of the second axial conductive lines 144 by selected. That is, their sensing steps do not process in order, such as interlaced scanning. Similarly, every first axial conductive line 124 could be sensed by selected and so does every second axial conductive line 144.

Or, several first axial conductive lines 124 could be sensed by selected and so do several second axial conductive lines 144.

Although specific embodiments have been illustrated and described, it will be obvious to those skilled in the art that various modifications may be made without departing from what is intended to be limited solely by the appended claims.

What is claimed is:

1. A device for preventing the influence of conducting material from point detection of projected capacitive touch panel, said device comprises:
   a first sensing layer, having a plurality of first axial conductive lines isolated from each other and correspondingly electrically connected to a plurality of first outside-connection conducting wires, wherein the plurality of the first axial conductive lines comprise all the conductive lines on the first sensing layer;
   a second sensing layer, having a plurality of second axial conductive lines isolated from each other and correspondingly electrically connected to a plurality of second outside-connection conducting wires, wherein said second sensing layer is on a dielectric layer, said first sensing layer, and a substrate in sequence, wherein the plurality of the second axial conductive lines comprise all the conductive lines on the second sensing layer;
   a signal driving line, electrically connecting to said plurality of second outside-connection conducting wires to provide a first sensing signal concurrently; and
   a sensing unit, electrically connecting said plurality of first and second outside-connection conducting wires to sense the sensing signals on said plurality of first axial conductive lines and second axial conductive lines;
   wherein said sensing signals of said plurality of first axial conductive lines on said first sensing layer, and said sensing signals of said plurality of second axial conductive lines on said second sensing layer, are provided concurrently;
   wherein said signal driving line further electrically connects to said plurality of first outside-connection conducting wires.

2. The device according to claim 1, wherein said first sensing layer, said plurality of first axial conductive lines, said second sensing layer, said plurality of second axial conductive lines, said dielectric layer and said substrate are transparent material.

3. The device according to claim 1, wherein said first sensing layer further comprises a plurality of first patterned transparent electrodes serially connected to said plurality of first axial conductive lines in cycle, said second sensing layer further comprises a plurality of second patterned transparent electrodes serially connected to said plurality of second axial conductive lines in cycle.

4. The device according to claim 1, wherein said signal driving line electrically connects to a control switch to receive and transmit said first sensing signal.

5. The device according to claim 4, wherein said control switch comprises one of follows: an electronic switch and electromechanical switch.

6. The device according to claim 1, wherein said sensing unit electrically connects to said plurality of first and second outside-connection conducting wires by at least one multiplexer.

7. The device according to claim 1, wherein said sensing unit comprises at least one of follows:
a current detector and a charge detector.

8. The device according to claim 1, wherein each of said second axial conductive lines electrically connects to said signal driving line.

9. A method for preventing the influence of conducting material from point detection of projected capacitive touch panel, said method comprising:
(a) providing a first sensing signal to a plurality of first axial conductive lines on a first sensing layer and a plurality of second axial conductive lines on a second sensing layer, concurrently, wherein the plurality of the first axial conductive lines comprise all the conductive lines on the first sensing layer, the plurality of the second axial conductive lines comprise all the conductive lines on the second sensing layer, and said plurality of first and second axial conductive lines are electrically isolated from, and perpendicular to, each other;
(b) sensing a plurality of second sensing signals and third sensing signals, wherein said plurality of second sensing signals are correspondingly generated by said plurality of first axial conductive lines receiving said first sensing signal, said plurality of third sensing signals are correspondingly generated by said plurality of second axial conductive lines receiving said first sensing signal, wherein the plurality of third sensing signals includes the stray capacitance between the first axial conductive lines and the second axial conductive lines; and
(c) utilizing at least one bigger change of said plurality of second and third sensing signals respectively to match a corresponding coordinate to get the position of at least one touch point on said corresponding coordinate.

10. The method according to claim 9, wherein a transparent dielectric layer is inserted between and used to isolate said plurality of first and second axial conductive lines.

11. The method according to claim 9, wherein step (b) comprises:
sensing said plurality of second and third sensing signals simultaneously.

12. The method according to claim 9, wherein step (b) comprises:
sensing said plurality of second and third sensing signals in sequence respectively.

13. The method according to claim 9, wherein step (b) comprises:
sensing said plurality of second and third sensing signals by selected respectively.

14. The method according to claim 9, wherein said first sensing signal is provided by at least one of follows:
a voltage-sensing source and a current-sensing source.

15. The method according to claim 9, wherein said plurality of second and third sensing signals are sensed by at least one of follows:
a current detector and a charge detector.

16. The method according to claim 9, wherein entire said first and entire said second axial conductive lines have the same voltage level when entire said first and entire said second axial conductive lines are provided said first sensing signal concurrently.

17. A method for preventing the influence of conducting material from point detection of projected capacitive touch panel, said method comprising:
(a) providing a first sensing signal to a plurality of first axial conductive lines concurrently, wherein said plurality of first axial conductive lines comprise all the conductive lines on a first sensing layer and are electrically isolated from each other;
(b) sensing a plurality of sensing signals of said plurality of first axial conductive lines and a plurality of sensing signals of a plurality of second axial conductive lines, wherein said plurality of second axial conductive lines comprise all the conductive lines on a second sensing layer and are electrically isolated from each other and are isolated from, and perpendicular to, said plurality of first axial conductive lines, said plurality of sensing signals of said plurality of first axial conductive lines are correspondingly generated by said plurality of first axial conductive lines receiving said first sensing signal, said plurality of sensing signals of said plurality of second axial conductive lines are correspondingly generated by said plurality of second axial conductive lines capacitively coupling said plurality of sensing signals of said plurality of first axial conductive lines; and
(c) utilizing at least one bigger change of said plurality of sensing signals of said plurality of first and second axial conductive lines respectively to match a corresponding coordinate to get the position of at least one touch point on said corresponding coordinate;
wherein said plurality of sensing signals of said plurality of first axial conductive lines on said first sensing layer, and said plurality of sensing signals of said plurality of second axial conductive lines on said second sensing layer, are provided concurrently;
wherein said plurality of sensing signals of said plurality of second axial conductive lines comprise the stray capacitance between said plurality of first axial conductive lines and second axial conductive lines.

18. The method according to claim 17, wherein a transparent dielectric layer is inserted between and used to isolate said plurality of first and second axial conductive lines.

19. The method according to claim 17, wherein step (b) comprises:
sensing said plurality of sensing signals of said plurality of first and second conductive lines simultaneously.

20. The method according to claim 17, wherein step (b) comprises:
sensing said plurality of sensing signals of said plurality of first and second axial conductive lines in sequence respectively.

21. The method according to claim 17, wherein step (b) comprises:
sensing said plurality of sensing signals of said plurality of first and second axial conductive lines by selected respectively.

22. The method according to claim 17, wherein said first sensing signal is provided by at least one of follows:
a voltage-sensing source and a current-sensing source.

23. The method according to claim 17, wherein said plurality of sensing signals of said plurality of first and second axial conductive lines are sensed by at least one of follows:
a current detector and a charge detector.

24. The method according to claim 17, wherein entire said first axial conductive lines have the same voltage level when entire said first axial conductive lines are provided said first sensing signal concurrently.

* * * * *